United States Patent [19]

Haas

[11] Patent Number: 4,458,954
[45] Date of Patent: Jul. 10, 1984

[54] TRACK TENSIONING ASSEMBLY FOR TRACKED VEHICLES

[75] Inventor: Karl Haas, Oberelchingen, Fed. Rep. of Germany

[73] Assignee: Valley Engineering Inc., Gray, Me.

[21] Appl. No.: 359,094

[22] Filed: Mar. 17, 1982

[30] Foreign Application Priority Data

Mar. 30, 1981 [DE] Fed. Rep. of Germany ....... 3112580

[51] Int. Cl.³ .............................................. B62D 55/30
[52] U.S. Cl. ........................................ 305/10; 305/31; 305/32
[58] Field of Search ...................... 305/10, 29, 31, 32, 305/27, 30, 23; 180/9.2 R; 172/4.5

[56] References Cited

U.S. PATENT DOCUMENTS

| 3,029,716 | 4/1962 | Shea | 172/4.5 X |
|---|---|---|---|
| 3,310,127 | 3/1967 | Siber et al. | 305/10 X |
| 3,765,730 | 10/1973 | Ishida | 305/10 |
| 3,901,563 | 8/1975 | Day | 305/31 X |
| 3,908,779 | 9/1975 | Inoue | 180/142 |
| 3,974,699 | 8/1976 | Morris et al. | 172/4.5 X |
| 4,045,893 | 9/1977 | Feinzilber et al. | 172/4.5 X |
| 4,244,123 | 1/1981 | Lazure et al. | 172/4.5 X |
| 4,255,883 | 3/1981 | Ealy | 172/4.5 X |
| 4,279,318 | 7/1981 | Meisel, Jr. | 305/10 X |

FOREIGN PATENT DOCUMENTS

| 0097932 | 8/1979 | Japan | 305/30 |
|---|---|---|---|
| 0047370 | 4/1981 | Japan | 305/10 |
| 1434440 | 5/1976 | United Kingdom | 305/10 |
| 0850483 | 7/1981 | U.S.S.R. | 305/10 |

Primary Examiner—David A. Scherbel
Assistant Examiner—Russell D. Stormer
Attorney, Agent, or Firm—Darby & Darby

[57] ABSTRACT

A tensioner for tracked vehicles includes a track-engaging tensioner wheel adapted to be adjusted by a tensioner element for adjusting the track tension. Automatic adaptation of the track tension to the terrain over which the vehicle travels is achieved by providing a control for actuating the tensioner element in response to the inclination of the vehicle, so that the track tension is reduced for uphill travel and increased for downhill travel.

9 Claims, 6 Drawing Figures

TRACK TENSIONING ASSEMBLY FOR TRACKED VEHICLES

BACKGROUND OF THE INVENTION

This invention relates to a track tensioning assembly for tracked vehicles, including a track-engaging tensioner wheel adapted to be operated by a tensioner element for adjusting track tension.

Hitherto it has been customary to adjust the track tension of tracked vehicles such as ski course maintenance vehicles by means of mechanical spindles or by hydraulic adjuster means. It has been found, however, that such permanent adjustment of the track tension, which has to be verified at more or less regular intervals, is not really practical, as the track tension may be advantageously reduced for uphill travel, thereby to reduce the power requirements for uphill travel of the tracked vehicle. On the other hand, reduced track tension may during downhill travel lead to the track overrunning the drive wheel, as the track tends to come under thrust strain between the last riding wheel and the drive wheel. This danger can only be avoided by an increased track tension during downhill drive.

SUMMARY OF THE INVENTION

It is thus an object of the invention to provide a track tensioning assembly adapted to automatically adjust the track tension of the vehicle in response to the configuration of the terrain over which the vehicle is travelling.

In a track tensioning assembly of the type identified in the introduction, this object is accomplished by control means for operating the tensioner element in response to the effective inclination of the vehicle in such a manner as to reduce the track tension during uphill travel and to increase the track tension during downhill travel. In one embodiment the invention provides that the control means comprises a pendulum actuator adapted during downhill travel to operate a valve of the hydraulically operated tensioner element so as to increase the track tension by adjusting the tensioner wheel accordingly.

For preventing the track tension from being varied for smaller irregularities of the terrain the control means is advantageously provided with a timing delay device.

The control means may advantageously be adjusted in such a manner that the tensioner element is actuated for increasing the track tension only at a downhill inclination of at least 8°.

As the majority of tracked vehicles is equipped with a hydrostatic traction drive, the objective set forth above may also be attained by said control means being connected to the hydrostatic traction drive via a pressure conduit so as to operate the hydraulic tensioner element in response to pressure variations in the traction drive system caused by uphill and downhill travel, respectively.

In an embodiment of this type, the control means may comprise a hydraulic pressure control switch adapted on the pressure on the high-pressure side of the hydrostatic traction drive exceeding a predetermined value to open a return valve associated with the hydraulic tensioner element, and on said pressure decreasing below a predetermined value to open a feed valve between the tensioner element and a pump for operating a piston of the tensioner element to increase the track tension for downhill travel.

For operating the piston of the tensioner element in the open position of the return valve, the above embodiment may comprise a pressure accumulator adapted to be charged while the feed valve is in its open position.

For closing the return valve after the pressure in the pressure accumulator has dropped below a predetermined value, and for closing the feed valve after the pressure in the pressure accumulator has reached a predetermined value, there are preferably provided between the return valve and the pressure control switch, and between the feed valve and the pressure control switch, respectively, a low pressure switch and a high pressure switch, both of which are connected to the pressure accumulator in such a manner as to open and close, respectively, the connection between the pressure control switch and the return valve, or the feed valve, respectively, in response to the pressure within the pressure accumulator.

A further improvement may be achieved by providing separate control means for each track of the vehicle.

BRIEF DESCRIPTION OF THE DRAWINGS

The invention shall now be described in detail with reference to three embodiment thereof shown in the accompanying drawings, wherein.

DESCRIPTION OF THE PREFERRED EMBODIMENTS

Figure 1:
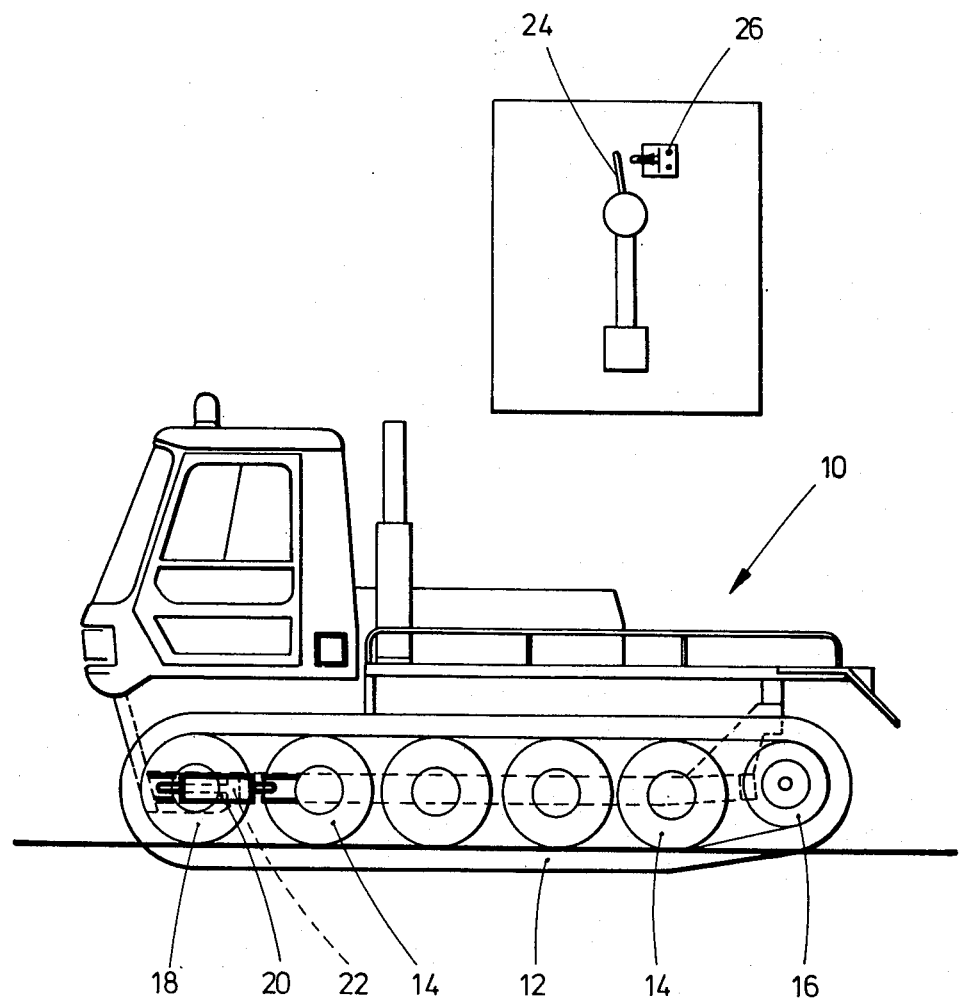
FIG. 1 shows a diagrammatic side elevation of a ski course maintenance vehicle having a track tensioner assembly according to the invention including a pendulum actuator shown separately on an enlarged scale, in the position assumed during travel on a horizontal plane.

FIG. 1 shows a tracked vehicle 10 in the form of a ski course maintenance vehicle during travel on a horizontal plane. Vehicle 10 is in the conventional manner provided with a pair of tracks 12, only one of which is shown in side elevation. Track 12 extends around a group of wheels 14 and is driven by a drive wheel 16. The forward return portion of track 12 is defined by a tensioner wheel 18 adapted to be adjusted in the longitudinal direction of the vehicle by means of a hydraulic tensioner element 20 for adjusting the track tension.

Hydraulic tensioner element 20 is in a per se known manner connected to a pump effective to operate a piston 22 of tensioner element 20. Closing and opening of a pressure conduit between tensioner element 20 and the pump is accomplished by means of a pendulum actuator 24 shown on an enlarged scale at the upper portion of FIG. 1 and effective to open or close a valve 26 in the pressure conduit between the pump and tensioner element 20 in response to the longitudinal inclination of vehicle 10. During travel on a horizontal plane as shown in FIG. 1, valve 26 is closed so as to interrupt communication between the pump and the hydraulic tensioner element.

Figure 2:
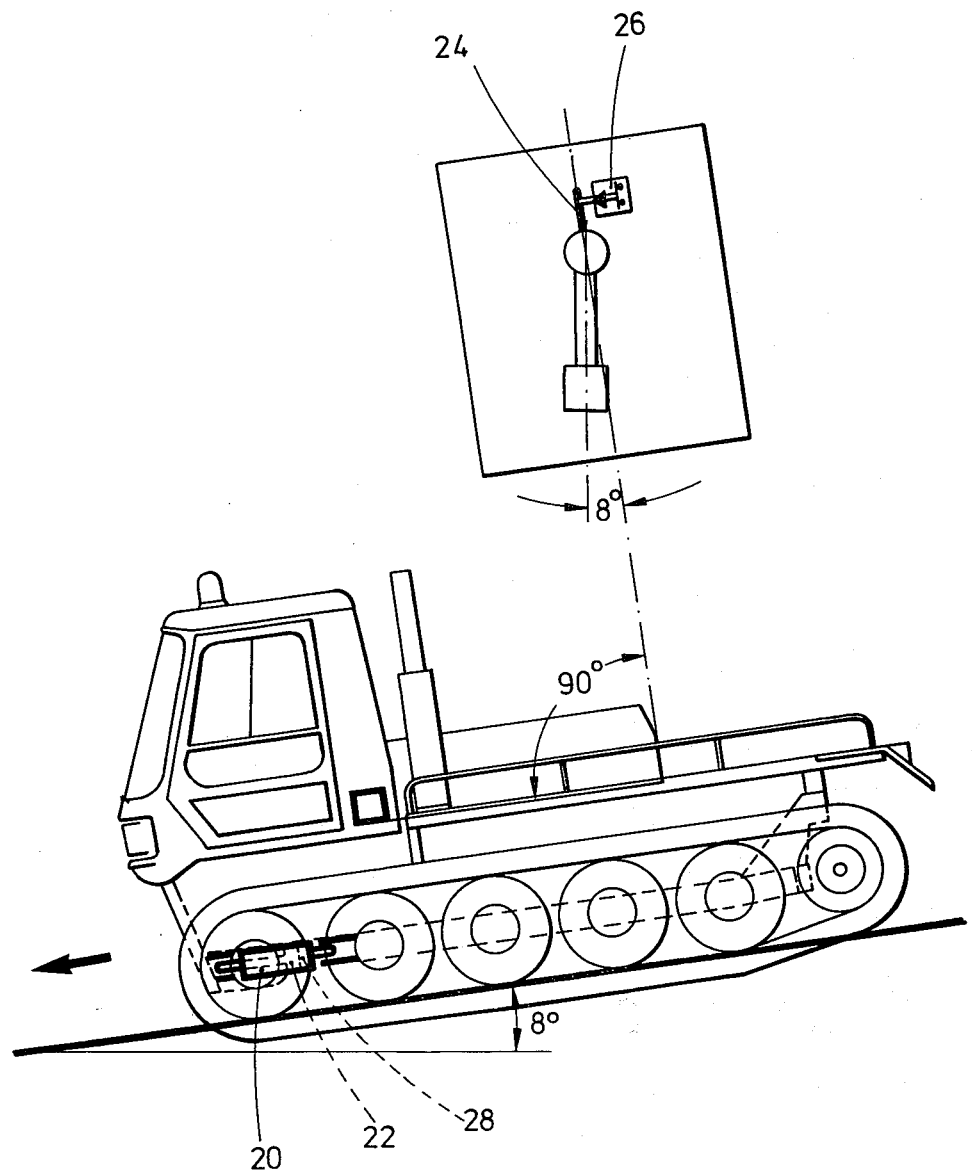
FIG. 2 shows the tracked vehicle of FIG. 1 with its pendulum actuator in the downhill travel condition.
Figure 4:
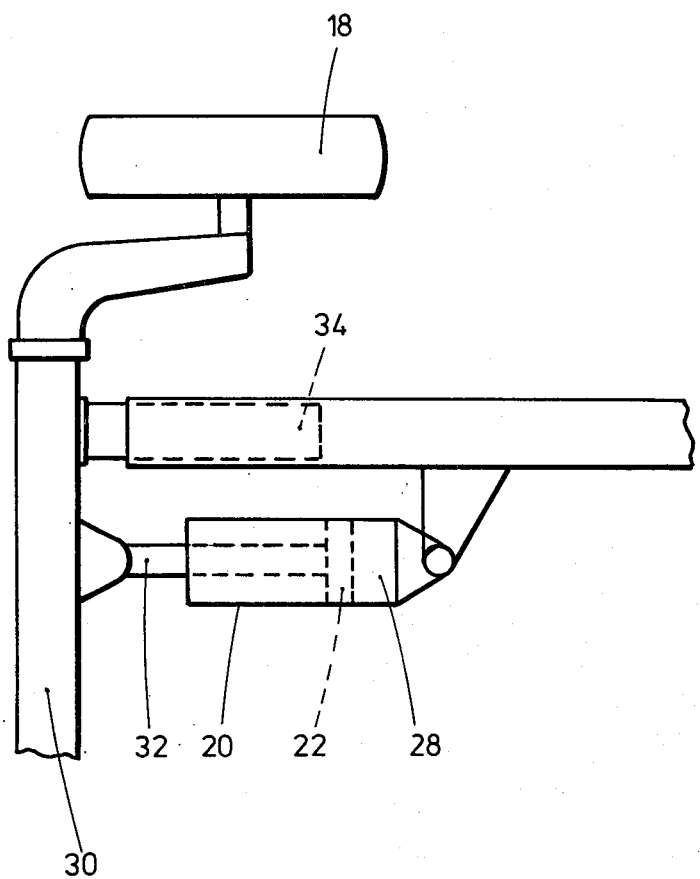
FIG. 4 shows a diagrammatic to plan view of the track tensioner assembly including a hydraulic tensioner element.

As shown in FIG. 2, downhill travel beyond a predetermined inclination, in the present case 8°, causes pendulum actuator 24 to open valve 26, so that the pump feeds the pressure medium to the head chamber 28 of tensioner element 20, whereby tensioner wheel 18 is adjusted for increasing the track tension as shown in FIG. 4. Tensioner wheel 18 is mounted on a cross member 30 of vehicle 10 and operatively connected to a piston rod 32 of tensioner element 20. A sliding guide assembly 34 is provided for guiding cross member 30 in the longitudinal direction.

Figure 3:
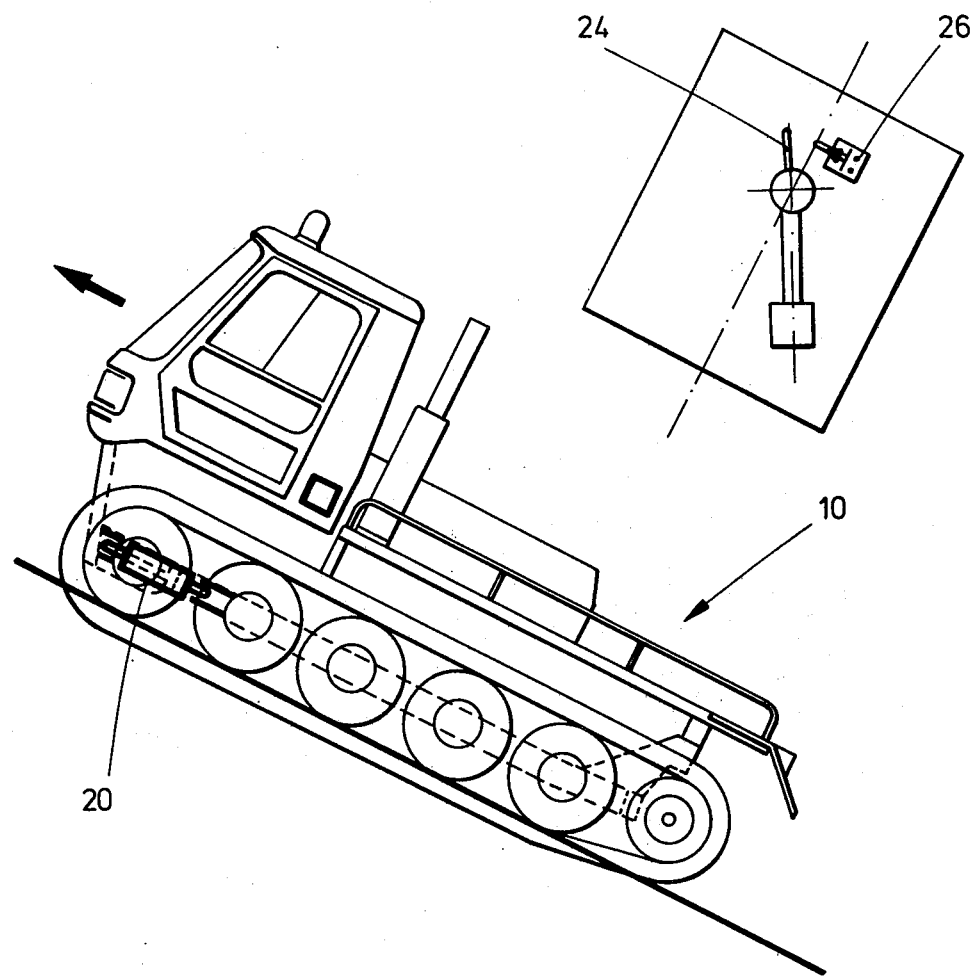
FIG. 3 shows the same tracked vehicle with its pendulum actuator in the uphill travel condition.

During uphill travel of vehicle 10 as shown in FIG. 3, pendulum actuator 24 releases valve 26, so that communication between the pump and the hydraulic tensioner element 20 is again interrupted. At the same time a return valve (not shown) is opened for permitting the track tension to be reduced.

As already noted above, the control means including pendulum actuator 24 is provided with a timing delay device for preventing the track tension from being adjusted each time vehicle 10 travels over a small depression or mound.

Figure 5:
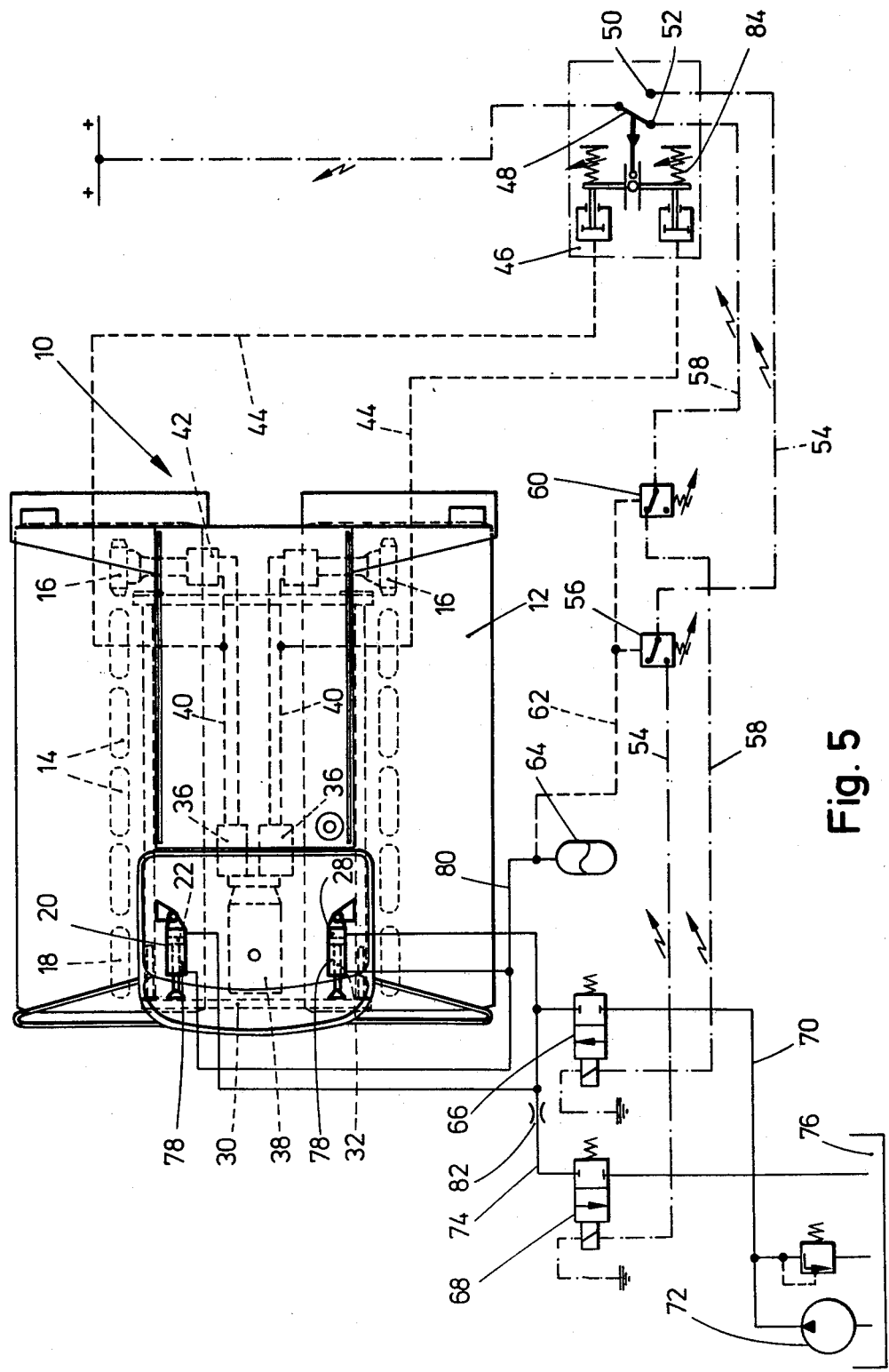
FIG. 5 shows a diagrammatic top plan view of a tracked vehicle having a hydrostatic traction drive system and another embodiment of a track tensioner assembly associated therewith, wherein the control means comprises a hydraulic pressure control switch, the electro-hydraulic circuitry of which is shown in diagrammatic form.

In the embodiment of the invention shown in FIG. 5, track vehicle 10 is equipped with a hydrostatic traction drive system including a pair of pumps 36 driven by the vehicle's engine 38. A separate high pressure conduit 40 connects each pump 36 to a respectively hydraulic motor 42 operative to rotate the drive wheel 16 on the respective side of vehicle 10.

The high pressure conduits 40 on each side of vehicle 10 are connected to a pressure control switch 46 via a pressure conduit 44. Pressure control switch 46 is mechanically connected to an electric switch 48 in such a manner that an increase of the operating pressure within conduit 44 beyond a predetermined value of for instance about 50 bar causes switch 48 to close on a contact 50, while at an operating pressure below this value it engages another contact 52. An electric lead 54 connects first contact 50 to a low pressure switch 56, while another electric lead 58 connects second contact 52 to a high pressure switch 60. Low pressure switch 56 and high pressure switch 60 are adapted to be actuated via a hydraulic conduit 62 in response to the pressure within a pressure accumulator 64 in a manner to be described later.

As further shown in FIG. 5, an extension of lead 54 connects low pressure switch 56 to a feed valve 68, while an extension of lead 58 connects high pressure switch 60 to a return valve 66.

Feed valve 66 is located in a hydraulic conduit 70 between the high pressure side of a pump 72 and the head chambers 28 of the two hydraulic tensioner elements 20. A further hydraulic conduit 74 connects head chambers 28 to a reservoir 76 via return valve 68.

The bottom chambers 78 of the two hydraulic tensioner elements 20 are connectes to pressure accumulator 64 through a conduit 80.

For a better understanding of the operation of the track tensioning assembly according to the invention shown in FIG. 5, reference shall at first be had to the condition during uphill travel of the vehicle or travel over a horizontal plane with tracks 12 at reduced tension. During travel along a horizontal plane, the normal operating pressure prevails in the high pressure conduits 40 on both sides of vehicle 10. As soon as the operating pressure is caused by uphill travel to increase beyond a predetermined level of for instance 50 bar, pressure control switch 46 operates switch 48 to close on first contact 50, whereby return valve 68 is energized via lead 54 and closed low pressure switch 56. Return valve 68 is designed as a solenoid valve adapted on energization to open hydraulic conduit 74 between head chambers 28 of tensioner elements 20 and reservoir 76. This permits pistons 22 to be retracted into tensioner elements 20 by the action thereon of the the pressure of for instance 80 bar accumulated in pressure accumulator 64, while the pressure medium is displaced from head chambers 28 to reservoir 76 via conduit 74 including a restriction 82 and opened return valve 68. In this manner, the piston rods 32 of tensioner elements 20 retract cross member 30 together with tensioner wheels 18 so as to reduce the track tension further.

During this adjustment the pressure in pressure accumulator drops to a switching pressure of for instance 30 bar to which pressure low-pressure switch 56 is preset. As soon as the pressure had dropped to this level, low pressure switch 56 opens to interrupt the current flow in lead 54, whereby return solenoid valve 68 is again closed, resulting in tensioner elements 20 coming to a stop in that position.

During downhill travel of tracked vehicle 10, the pressure in high pressure conduits 40 of the hydrostatic traction drive system drops to a minimum value of for instance 12 bar. The pressure drop of the operating pressure below the value of for instance 50 bar causes pressure control switch 46 to be reset by the action of reset springs 84, whereby electric switch 48 closes on second contact 52. This closes the electric circuit formed by lead 58, high pressure switch 60 and feed valve 66 also designed as a solenoid valve. Energization of feed valve 66 results in a hydraulic connection being established via conduit 70 between pump 72 and head chambers 28 of the twin hydraulic tensioner elements 20. Pump 72 now feeds pressure medium to the head chambers 28 of tensioner elements 20, whereby pistons 22 thereof are extended and pressure accumulator 64 is recharged via conduit 80. This movement of piston rods 32 causes cross member 30 to be advanced together with tensioner wheels 18 so as to increase the tension of tracks 12.

The described adjustment operation results in pressure accumulator 64 being recharged to a pressure of about 80 bar, whereupon high pressure switch 60 is opened via hydraulic conduit 62 to interrupt the connection via electric lead 58 to feed valve 66. This causes feed valve 66 to close, whereby the pressure medium flow from pump 72 to tensioner elements 20 is interrupted and the latter are retained in their respective positions.

The capacity of pressure accumulator 64 is a function of the adjustment stroke of hydraulic tensioner elements 20 which has to be determined empirically.

Figure 6:
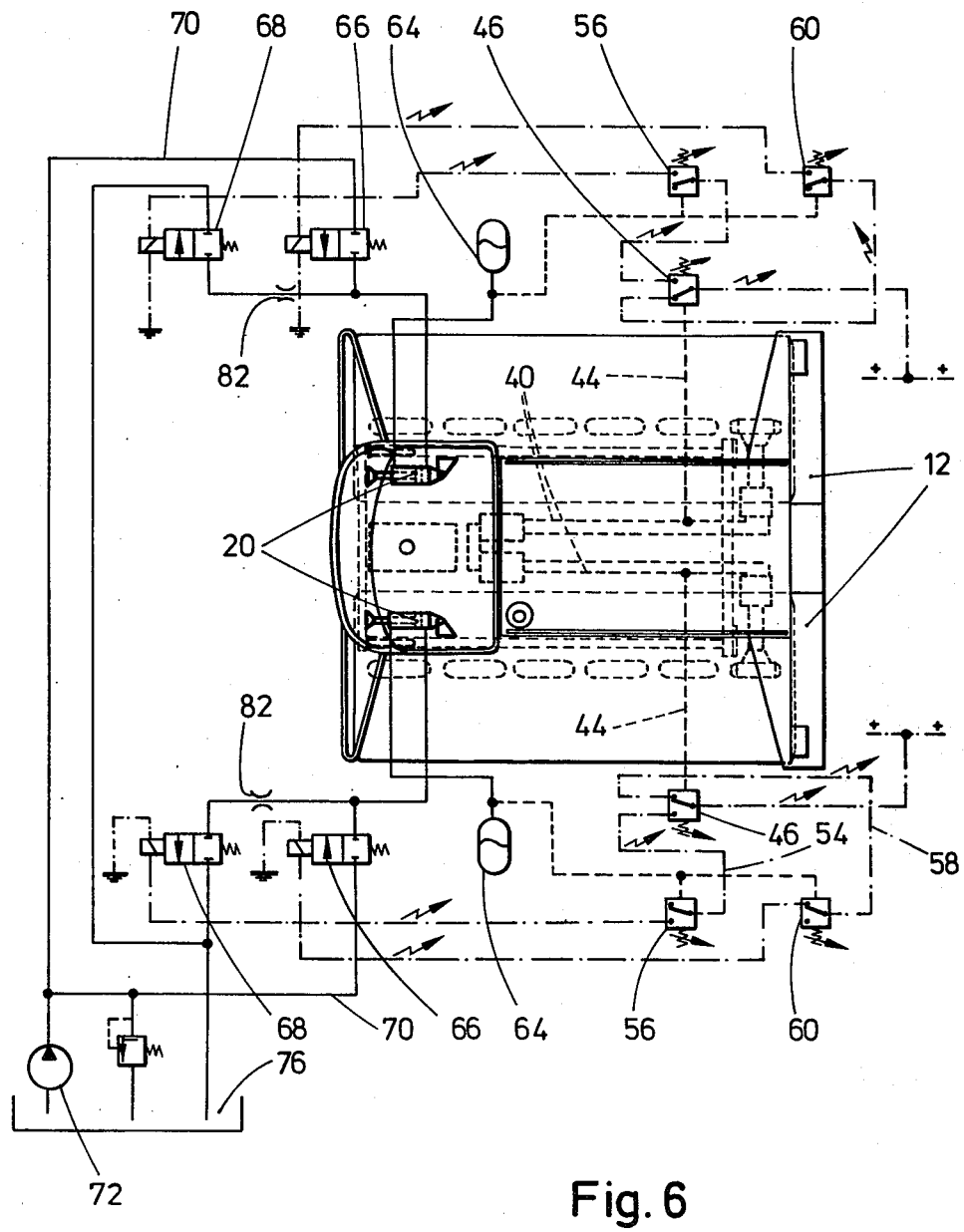
FIG. 6 shows a circuit diagram of an embodiment similar to the one shown in FIG. 5, wherein separate control means are provided for each track of the vehicle.

FIG. 6 shows a modification of the embodiment shown in FIG. 5 which differs from the latter by there being provided a separate control circuit similar to the one shown in FIG. 5 for each track 12. Both control circuits are connected to a common pump 72. This modification offers the advantage that the tension of each track 12 may be adjusted separately.

It is of course possible to replace the electro-hydraulic control circuitry shown and described by a purely hydraulic control arrangement, although this would be less favourable with regard to costs.

I claim:

1. A track tensioning assembly for tracked vehicles, including a track-engaging tensioner wheel adapted to be operated by a tensioner element for adjusting track tension, characterized by control means responsive directly to the effective inclination of the vehicle for operating said tensioner element in such a manner as to reduce the track tension during uphill travel and to increase the track tension during downhill travel.

2. A track tensioning assembly according to claim 1 wherein the tensioner element is hydraulically operated, characterized in that said control means includes a pendulum actuator adapted during downhill travel to operate a valve of the tensioner element so as to increase the track tension by adjusting said tensioner wheel accordingly.

3. A track tensioning assembly according to claim 1 or 2, characterized in that said control means includes a timing delay device.

4. A track tensioning assembly according to claim 1 or 2, characterized in that said control means operates said tensioner member for increasing the track tension only at a downhill inclination of at least about 8°.

5. A track tensioning assembly according to claim 1, wherein said tracked vehicle is provided with hydrostatic traction drive, characterized in that said control means communicates with said hydrostatic traction drive via a pressure conduit so as to operate said hydraulic tensioner element in response to pressure variations in said traction drive caused by uphill and downhill travel, respectively.

6. A track tensioning assembly according to claim 5, characterized in that said control means comprises a hydraulic pressure control switch adapted, when the pressure on the high-pressure side of said hydrostatic traction drive exceeds a predetermined value, to open a return valve associated with said hydraulic tensioner element, and, when said pressure decreases below a predetermined value, to open a feed valve between said tensioner element and a pump for operating a piston of said tensioner element to increase the track tension during downhill travel.

7. A track tensioning assembly according to claim 6, characterized in that for operating said piston of said tensioner element in the open position of said return valve there is provided a pressure accumulator adapted to be charged while said feed valve is in its open position.

8. A track tensioning assembly according to claim 7, characterized in that between said return valve and said pressure control switch, and between said feed valve and said pressure control switch, there are provided a low pressure switch and a high pressure switch, respectively, both of which are connected to said pressure accumulator in such a manner as to open and close, respectively, the connection between said pressure control switch and said return valve, and said feed valve and said return valve, and said feed valve, respectively, in response to the pressure within said pressure accumulator.

9. A track tensioning assembly according to claim 1 or 2, characterized in that separate control means is provided for each track of said vehicle.

* * * * *